United States Patent
Lee et al.

(10) Patent No.: US 9,181,132 B2
(45) Date of Patent: Nov. 10, 2015

(54) GYPSUM SLURRIES AND BOARDS AND METHODS OF MAKING THE SAME

(75) Inventors: Ronald A. Lee, Branchburg, NJ (US); David T. Durocher, Westland, MI (US); Sridhar Gopalkrishnan Iyer, Matthews, NC (US); Richard J. Romanek, Tega Cay, SC (US); Eli Stav, Charlotte, NC (US); Karen Fey, Indian Trail, NC (US)

(73) Assignee: BASF CORPORATION, Florham Park, NJ (US)

( * ) Notice: Subject to any disclaimer, the term of this patent is extended or adjusted under 35 U.S.C. 154(b) by 351 days.

(21) Appl. No.: 13/403,490

(22) Filed: Feb. 23, 2012

(65) Prior Publication Data

US 2012/0237756 A1    Sep. 20, 2012

Related U.S. Application Data

(60) Provisional application No. 61/445,946, filed on Feb. 23, 2011.

(51) Int. Cl.
| | |
|---|---|
| *C04B 28/14* | (2006.01) |
| *B32B 3/26* | (2006.01) |
| *B32B 13/08* | (2006.01) |

(Continued)

(52) U.S. Cl.
CPC . *C04B 28/14* (2013.01); *B32B 3/26* (2013.01); *B32B 13/08* (2013.01); *B32B 13/14* (2013.01); *C04B 24/32* (2013.01); *B32B 2250/02* (2013.01); *B32B 2250/03* (2013.01);
(Continued)

(58) Field of Classification Search
USPC ............... 428/317.9, 312.4; 106/680; 524/4
See application file for complete search history.

(56) References Cited

U.S. PATENT DOCUMENTS

| | | |
|---|---|---|
| 3,111,427 A | 11/1963 | Wagner |
| 4,018,618 A | 4/1977 | Petri et al. |

(Continued)

FOREIGN PATENT DOCUMENTS

| | | |
|---|---|---|
| CN | 101203466 A | 6/2008 |
| WO | WO 99/35103 A1 | 7/1999 |

(Continued)

OTHER PUBLICATIONS

International Search Report for Application No. PCT/US2012/026295 dated May 21, 2012, 4 pages.

(Continued)

*Primary Examiner* — Hai Vo
(74) *Attorney, Agent, or Firm* — Howard & Howard Attorneys PLLC (57) ABSTRACT

A slurry for manufacturing gypsum board comprises calcined gypsum, water, a foaming agent, and a coalescing agent. The foaming agent imparts a plurality of bubbles in the slurry. Typically, a foam is pre-generated with the foaming agent and the foam is used to form the slurry such that the foam imparts the plurality of bubbles in the slurry. The coalescing agent coalesces the plurality of bubbles imparted by the foam. Typically, the coalescing agent coalesces a plurality of small and partially joined bubbles imparted by the foam to create larger and more discrete bubbles. A gypsum board and method of forming the slurry and the gypsum board are also disclosed. The gypsum board comprises a gypsum layer formed from the slurry. The gypsum layer defines a plurality of bubbles dispersed therein, which are imparted by the foam and coalescing agent of the slurry.

36 Claims, 9 Drawing Sheets

(51) Int. Cl.
*B32B 13/14* (2006.01)
*C04B 24/32* (2006.01)

(52) U.S. Cl.
CPC ...... *B32B 2262/101* (2013.01); *B32B 2266/08* (2013.01); *B32B 2307/72* (2013.01); *Y10T 428/249968* (2015.04)

(56) References Cited

U.S. PATENT DOCUMENTS

| | | | |
|---|---|---|---|
| 4,209,336 A * | 6/1980 | Previte | 106/724 |
| 4,676,835 A | 6/1987 | Green et al. | |
| 4,678,515 A | 7/1987 | Green et al. | |
| 4,772,328 A | 9/1988 | Pfeifer | |
| 5,240,639 A | 8/1993 | Diez et al. | |
| 5,258,072 A | 11/1993 | Gopalkirshnan et al. | |
| 5,360,841 A | 11/1994 | Knop et al. | |
| 5,466,393 A | 11/1995 | Diez et al. | |
| 5,643,510 A | 7/1997 | Sucech | |
| 5,783,549 A | 7/1998 | Gopalkrishnan et al. | |
| 5,888,322 A | 3/1999 | Holland | |
| 6,171,388 B1 | 1/2001 | Jobbins | |
| 6,422,734 B1 | 7/2002 | Sethuraman et al. | |
| 6,489,381 B1 | 12/2002 | Dreher et al. | |
| 6,527,850 B2 | 3/2003 | Schwartz et al. | |
| 6,545,067 B1 | 4/2003 | Buchner et al. | |
| 6,617,387 B2 | 9/2003 | Dreher et al. | |
| 6,656,994 B1 | 12/2003 | Dreher et al. | |
| 6,706,128 B2 | 3/2004 | Sethuraman et al. | |
| 6,783,587 B2 | 8/2004 | Sethuraman et al. | |
| 6,803,396 B2 | 10/2004 | Gopalkrishnan et al. | |
| 6,809,148 B1 | 10/2004 | Koppers et al. | |
| 6,869,988 B2 | 3/2005 | Schwartz et al. | |
| 6,936,099 B2 | 8/2005 | Ayambem | |
| 7,008,990 B2 | 3/2006 | Raether et al. | |
| 7,056,460 B2 | 6/2006 | Englert | |
| 7,070,648 B1 | 7/2006 | Schwartz et al. | |
| 7,202,319 B2 | 4/2007 | Spindler et al. | |
| 7,261,772 B1 | 8/2007 | Schwartz et al. | |
| 7,393,424 B2 | 7/2008 | Schwartz et al. | |
| 7,399,355 B2 | 7/2008 | Szymanski et al. | |
| 7,612,150 B2 | 11/2009 | Spindler et al. | |
| 7,632,348 B2 | 12/2009 | Cowan et al. | |
| 7,637,996 B2 | 12/2009 | Blackburn et al. | |
| 7,655,710 B2 | 2/2010 | Hommer et al. | |
| 7,776,461 B2 | 8/2010 | Blackburn et al. | |
| 7,776,462 B2 | 8/2010 | Liu et al. | |
| 7,855,260 B2 | 12/2010 | Bichler et al. | |
| 7,875,114 B2 | 1/2011 | Wittbold et al. | |
| 8,016,961 B2 | 9/2011 | Martin et al. | |
| 8,080,104 B2 | 12/2011 | Otsuka et al. | |
| 2001/0001218 A1 | 5/2001 | Luongo | |
| 2002/0017222 A1 | 2/2002 | Luongo | |
| 2002/0132946 A1 | 9/2002 | Kristenmacher et al. | |
| 2004/0028956 A1 | 2/2004 | Savoly et al. | |
| 2006/0281885 A1 | 12/2006 | Bichler | |
| 2007/0227404 A1 | 10/2007 | Plank et al. | |
| 2008/0000392 A1 | 1/2008 | Blackburn et al. | |
| 2008/0009566 A1 * | 1/2008 | Blackburn et al. | 524/5 |
| 2008/0057318 A1 | 3/2008 | Adzima et al. | |
| 2010/0186870 A1 | 7/2010 | Stuart et al. | |
| 2010/0210761 A1 | 8/2010 | Hommer et al. | |
| 2012/0214887 A1 * | 8/2012 | Stav et al. | 521/83 |

FOREIGN PATENT DOCUMENTS

| | | |
|---|---|---|
| WO | WO 99/47470 A1 | 9/1999 |
| WO | WO 03/000620 A1 | 1/2003 |
| WO | WO 2010/085634 A1 | 7/2010 |

OTHER PUBLICATIONS

English language abstract not found for CN 101203466; however, see English language equivalent U.S. Pat. No. 7,776,462. Original document extracted from espacenet.com database on Jan. 5, 2015, 15 pages.

\* cited by examiner

GYPSUM SLURRIES AND BOARDS AND METHODS OF MAKING THE SAME

CROSS REFERENCE TO RELATED APPLICATIONS

This application claims the benefit of U.S. Provisional Patent Application Ser. No. 61/445,946, filed on Feb. 23, 2011, which is incorporated herewith by reference in its entirety.

FIELD OF THE INVENTION

The present invention generally relates to a slurry and to a gypsum board formed from the slurry, and more specifically to a slurry comprising calcined gypsum, water, a foaming agent and a coalescing agent, to a gypsum board formed from the slurry, and to methods of forming the slurry and the gypsum board.

DESCRIPTION OF THE RELATED ART

Gypsum board is a composite material made from two cover sheets or facers (Face/Back) with a gypsum layer (or gypsum core) sandwiched between the sheets. Physical properties of the facers, facer/gypsum core bond, and strength of the gypsum core, all influence physical properties of the gypsum board.

A conventional gypsum core contains about 60% to 80% air by volume, which depends in part on the components used to form the gypsum core and the amount and structure of foam formed during manufacture of the gypsum core. The gypsum core is formed from a slurry, which is foamed, e.g. air is entrained as the slurry is made by the introduction of foam to the slurry. The foam is pre-generated and continuously fed to the slurry and homogeneously mixed with the slurry. The foam is typically pre-generated by use of a foaming agent, foaming water, and air in a foam generator. The size and distribution of the air bubbles in the gypsum core affects gypsum board strength (e.g. nail pull) and the bonds between the facers and the gypsum core. The air bubbles can vary in size, shape, and distribution within the gypsum core. The remaining gypsum core between the air bubbles comprises gypsum crystals that form a solid matrix between the air bubbles. Typically, the wider the solid matrix between the bubbles, the stronger the gypsum core. The solid matrix is generally made from gypsum crystals and to a less extent, starch. In creating the board, it is to be appreciated that there is a delicate balance between decreasing weight of the gypsum board while maintaining strength of the gypsum board.

Recently, the gypsum industry has attempted to achieve more desirable air bubble distribution in the gypsum core. Most efforts have been directed toward changing chemistry of foaming agents to generate less-stable foam to add to the slurry during manufacture of the gypsum core. Generally, relative to foam generated from a stable foaming agent, a less-stable foaming agent will, on its own, generate foam that will coalesce more. This generally results in larger and more discrete air bubbles in the gypsum core. Most efforts were focused on reducing foam stability by reducing the amount of ethoxy groups in the foaming agent molecule (even down to zero ethoxy groups), changing its chain length, and altering between linear and branched structure structures.

Unfortunately, changing the stable foaming agent to a less-stable foaming agent to achieve the desired foam structure in the gypsum core requires many process modifications. These modifications require skilled personnel and can create process issues and yield loss during gypsum board production. Foaming agent changes from product to product complicates the production process and may require changes to the loading rate of the foaming agent.

As such, there remains an opportunity to provide improved slurries for manufacturing gypsum boards. In addition, there remains an opportunity to provide improved gypsum boards and improved methods of making slurries and gypsum boards.

SUMMARY OF THE INVENTION AND ADVANTAGES

The present invention provides a slurry for manufacturing gypsum board. The slurry comprises calcined gypsum, water, a foaming agent, and a coalescing agent. The foaming agent imparts a plurality of bubbles in the slurry. The coalescing agent coalesces the plurality of bubbles imparted by the foaming agent. A gypsum board and method of forming the slurry and the gypsum board are also provided. The gypsum board comprises a gypsum layer formed from the slurry. The gypsum layer defines a plurality of bubbles dispersed therein, which are imparted by the foaming and coalescing agents of the slurry.

The coalescing agent can act to partially collapse (or coalesce) the foamed slurry prior to setting of the slurry to a pseudo-plastic state (which may also be referred to as stiffening of the slurry), thus allowing some of the bubbles in the foamed slurry to come together to create larger bubbles in the slurry without total collapse of the bubble structure. The coalescing agent also helps to stabilize the resulting bubbles until the gypsum matrix sets. Once the gypsum matrix sets, a plurality of bubbles (e.g. air bubbles) are dispersed therein based on the bubbles imparted by the foaming and coalescing agents. Typically, the coalescing agent coalesces a plurality of small and partially joined bubbles imparted by the foaming agent to create larger and more discrete bubbles. It is believed that the more uniform and distinct bubble structure provides to lower the bulk density of the gypsum layer for reduced weight of the gypsum board, while substantially maintaining or even improving strength of the gypsum board relative to conventional gypsum boards.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

The present invention provides a slurry, a gypsum board formed from the slurry, and methods of making the slurry and the gypsum board. The slurry can be used to form the gypsum board, and more specifically to form a gypsum layer (e.g. gypsum core) of the gypsum board. The slurry may also be referred to in the art as a stucco slurry. The gypsum board may also be referred to in the art as drywall, plasterboard, gypsum wallboard, wallboard, etc. The gypsum board is not limited to any particular use, i.e., the gypsum board may be used for walls, ceilings, floors, tile-bases, soffits, etc. The gypsum board and methods are described further below. Exemplary embodiments of the slurry will now be described.

The slurry generally comprises calcined gypsum, water, a foaming agent, and a coalescing agent. Typically, the slurry comprises a foam which comprises the foaming agent, such that the slurry generally comprises calcined gypsum, water, the foam, and the coalescing agent. The slurry may also comprise one or more additives, such as conventional additives. Examples of suitable additives are described and exemplified further below.

The present invention is not limited to any particular type of calcined gypsum. The calcined gypsum may also be referred to in the art as calcium sulfate hemihydrate ($CaSO_4 \cdot 0.5H_2O$), stucco or plaster of Paris. Examples of suitable calcined gypsum, as well as sources, methods, and reactions for obtaining the calcined gypsum, are described in: U.S. Pat. No. 8,016,961 to Martin et al.; U.S. Pat. No. 6,706,128 to Sethuraman; U.S. Pat. No. 6,422,734 to Sethuraman et al.; and U.S. Pat. No. 6,783,587 to Sethuraman et al.; hereinafter referred to as the incorporated references, the disclosures of which are incorporated herein by reference in their entirety so long as the incorporated disclosure does not conflict with the general scope of the present invention.

Calcined gypsum is capable of reacting with water, thereby forming a reaction product comprising dihydrous calcium sulfate and typically, residual water. The reaction between the calcined gypsum and water is shown generally below:

$$CaSO_4 \cdot 0.5H_2O + 0.5H_2O \rightarrow CaSO_4 \cdot 2H_2O + heat$$

In this reaction, the calcined gypsum is rehydrated to its dihydrate state ($CaSO_4 \cdot 2H_2O$) over a fairly short period of time. The actual time required for the reaction generally depends upon the type of calciner employed and the type of gypsum rock that is used to form the calcined gypsum (e.g., as described in the incorporated references). The reaction time can be controlled to a certain extent by the use of additives such as accelerators and retarders, which are described further below. As illustrated above, the reaction gives off heat, i.e., the reaction is exothermic. During the reaction, the slurry will generally transition from a fluid state to a hard or "set" state as the (hydration) reaction product forms/sets. The slurry will generally become set (i.e., less fluid or stiff) after about 15 seconds to about 40 seconds. This may be referred to in the art as a stiffening phase. After setting, the slurry can be cut into various lengths.

The calcined gypsum can be used in various amounts. Typically, the slurry is manufactured and manipulated such that a gypsum layer formed therefrom, i.e., the reaction product, will have a conventional thickness, such as a thickness less than 1 inch, more typically a thickness of from about ¼ to about ⅝ inch. The amount of calcined gypsum that is present in the slurry will depend on the desired thickness of the board. For example, when a ½ inch thick board is desired, the slurry will typically contain calcined gypsum in an amount of from about 337 to about 1180 lbs per 1000 square feet (msf), about 548 to about 970 lbs/msf, or about 674 to about 843 lbs/msf. The amounts of calcined gypsum given in msf can be applied to and adjusted for various thicknesses of the gypsum layer formed from the slurry. For example, for a ⅝ inch thick board, the slurry will typically contain calcined gypsum in an amount from about 1785 lbs/msf to about 2040 lbs/msf. General dimensions and manufacturing methods of gypsum boards are described further below.

Typically, the water and the calcined gypsum are reacted in a weight ratio of from about 0.5 to about 1.5, about 0.75 to about 1.25, or about 0.80 to about 1.0. Generally, it is desirable to provide enough water for the calcined gypsum to react with, but not with such an amount of water that removing residual water after the reaction is unduly time consuming or expensive.

As introduced above, the reaction between the calcined gypsum and water is exothermic. As such, after forming the slurry, the slurry initially has an initial temperature ($T_1$) and a peak temperature ($T_2$) while the slurry transitions from the fluid to a pseudo-plastic state to a final set state. Said another way, the reaction product of the calcined gypsum and water has the $T_1$ and the $T_2$ as the reaction occurs. Each of the temperatures may also be referred to as mix or slurry temperatures, e.g. an initial slurry temperature $T_1$ and a peak slurry temperature $T_2$. The $T_1$ may be ambient, depending on location of manufacture of the slurry. Alternatively, the $T_1$ may be lower than ambient, more typically warmer than ambient, because one or more of the components of the slurry is heated prior to making the slurry. While atypical, it is to be appreciated that one or more of the components may also be cooled prior to making the slurry. The slurry itself can also be heated or cooled (or left alone) as the reaction between the calcined gypsum and water occurs to form the reaction product.

The $T_2$ is generally the highest temperature the slurry reaches while the reaction takes place. The temperature of the slurry, and therefore, the reaction product, increases from the $T_1$ to the $T_2$ due to the heat given off by the exothermic reaction. Typically, the $T_1$ of the slurry/reaction product is from about 21.0 to about 52.0, about 23.0 to about 48.0, or about 30.0 to about 43.0, °C. Typically, the $T_2$ of the slurry/reaction product is from about 43.0 to about 74.0, about 45.0 to about 70.0, or about 45.0 to about 55.0, °C.

The foaming agent may be any type of foaming agent, including, but not limited to, the foaming agents described in the incorporated references. The foaming agent typically comprises a solution of one or more soaps/surfactants and a solvent. Typically, the foaming agent comprises an anionic surfactant; however, other types of surfactants can also be used, such as in cationic surfactants, nonionic surfactants, etc. The solvent is typically water (such that the solution is aqueous), an alcohol (e.g. ethanol, isopropanol, etc.), or a combination thereof. The foaming agent typically comprises about 30 to about 60 wt % actives of soap/surfactant. As described above, the remainder of the foaming agent can be solvent (e.g. water or alcohol) or a combination of solvents. The foaming agent can be used to generate foam by any number of conventional foam generating methods.

In certain embodiments, the surfactant of the foaming agent comprises a sulfate or a sulfonate. In further embodiments, the surfactant of the foaming agent comprises an ammonium ether sulfate. Specific examples of suitable foaming agents, include those comprising: ammonium alkyl sulfates; alkyl ether sulfates having at least an average of 1.5 moles of ethylene oxide per mole of foaming agent, alkyl ether sulfates having at least an average of 4.0 moles of ethylene oxide per mole of foaming agent; a sulfonate ethoxylated molecule with a C-8 to C-12 chain, for example, having an average of 4.0 moles of ethylene oxide per mole of foaming agent; alkyl aryl sulfonates, C-12 to C-16 alpha sulfonated methyl esters, alpha olefin sulfonates, and mixtures thereof; alkyl ether sulfates having on average between 1.5 and 2.5 moles of ethylene oxide per mole of foaming agent, sodium dodecylbenzenesulfonate, and triethanolamine dodecylbenzene sulfonate; a foaming agent described by the chemical formula $CH_3(CH_2)_bCH_2(OCH_2CH_2)_cOSO_3M_2$, wherein b has an average value in the range of 6.5 and 7.5; wherein c is the average number of moles of ethylene oxide per mole of foaming agent and is in the range of 1.5 and 2.5; and $M_2$ is selected from the group consisting of sodium, potassium, magnesium, ammonium, quaternary ammonium, and mixtures thereof; or wherein c is approximately 2.2, and $M_2$ is selected from the group consisting of sodium, ammonium, and quaternary organic derivatives of ammonium. It is to be appreciated that any number of foaming agents can be used to create the foam for the slurry. In certain embodiments, the foaming agent comprises Cedepal® FA-406, which is commercially available from the Stepan Company of Northfield, Ill. Other foaming agents from Stepan Company can also be used, as well as foaming agents from other companies such as Thatcher TF, which is commercially available from Thatcher Chemical Company of Salt Lake City, Utah; and Hyonic® PFM, e.g. Hyonic® PFM 30, which is commercially available from Geo Specialty Chemicals of Lafayette, Ind.

Further specific examples of suitable foaming agents include those comprising: alkyl sulfates having at least a ten carbon chain, alkyl ether sulfates having less than an average of 1.3 moles of ethylene oxide per mole of foaming agent, and mixtures thereof; ammonium lauryl sulfate, and alkyl ether sulfates having approximately 0.4 to 1.3 moles of ethylene oxide per mole of foaming agent; a foaming agent described by the chemical formula $R(OCH_2CH_2)_aOSO_3M_1$, wherein R represents linear and branched hydrocarbons having a maximum molecular weight of about 169, and mixtures thereof; wherein a is the average number of moles of ethylene oxide per mole of foaming agent and is in the range of 0.4 and 1.3, and $M_1$ is selected from the group consisting of sodium, potassium, magnesium, ammonium, quaternary organic derivatives of ammonium, and mixtures thereof; or wherein a is approximately 0.8, and $M_1$ is selected from the group consisting of ammonium and quaternary organic derivatives thereof. In certain embodiments, the foaming agent comprises Alpha Foamer®, which is commercially available from the Stepan Company.

The foaming agent can be used in various amounts. Typically, the foaming agent is present in the slurry in an amount of from about 0.1 to about 2.0 lbs per 1000 square feet (msf), about 0.4 to about 1.25 lbs/msf, or about 0.5 to about 0.9 lbs/msf. The foaming agent can comprise a combination or two or more of the aforementioned surfactants. In certain embodiments, the slurry includes one foaming agent. In other embodiments, the slurry includes two or more different foaming agents.

The foaming agent may be in various forms, such as liquid, flake, or powdered form. The foaming agent is useful for generating foam that imparts a plurality of bubbles in the slurry during formation of the reaction product. By imparting, it is generally meant that the foaming agent, i.e., the foam comprising the foaming agent, brings bubbles into the slurry and/or forms bubbles in the slurry during formation. The bubbles are typically air bubbles, but may include other gases as well. The bubbles can be of various sizes and shapes as described further below. Generally, the foaming agent itself is frothed such that it includes bubbles before addition to form the slurry. Frothing can occur simply by mixing, through mechanical agitation, the foaming agent, water, and air to form the foam (also referred to herein as the pre-generated foam). The pre-generated foam can be added along with water to the calcined gypsum and water and/or after the calcined gypsum and water are combined. The foam can be generated by combining the foaming agent, foam water and air in a foam generator.

The coalescing agent coalesces the plurality of bubbles imparted by the foaming agent, i.e., the foam comprising the foaming agent. The coalescing agent generally coalesces the plurality of bubbles to create larger bubbles. While many different coalescing agents can be used to serve such a purpose, it is preferred to select a coalescing agent that has a delayed coalescing action, so the coalescing agent does not coalesce the plurality of bubbles until after a period of time has passed from when the coalescing agent is first added to the slurry. In other words, coalescing action by the coalescing agent is delayed for a period of time while the coalescing agent is in the slurry along with bubbles formed by the foaming agent. In addition, the coalescing agent typically helps to stabilize the resulting bubble structure during this latency period. The period of time is typically less than the time it takes for the reaction product to set (e.g. about 15 to about 40 seconds), such that the coalescing agent can act.

Typically, the coalescing agent acts to form larger and discrete bubbles from the bubbles imparted by the foam. This is based on a coalescing mechanism. In this mechanism, it is believed that the coalescing agent drains water from a lamellae that separates two or more bubbles, thinning the lamellae and ultimately rapture the lamellae causing the disappearance of the two or more bubbles and forming one or more larger bubbles therefrom. It is also believed that the coalescing agent stabilizes these larger bubbles such that they are still present while the reaction product sets, such that the reaction product defines a plurality of bubbles imparted by the foaming and coalescing agents, i.e., imparted by the respective bubbles formed therefrom.

The coalescing agent has a cloud point ($T_{CP}$). The $T_{CP}$ of the coalescing agent is typically between the $T_1$ and the $T_2$ of the slurry/reaction product. As such, the coalescing agent coalesces the plurality of bubbles in the slurry after the temperature of the slurry reaches the $T_{CP}$ of the coalescing agent. This point is not necessarily exact, as the $T_{CP}$ may vary, but a period of time does typically pass before coalescing of the bubbles begins which were imparted by the foam. It is believed that coalescing action of the coalescing agent generally increases as the temperature of the slurry/reaction product surpasses the $T_{CP}$.

The $T_{CP}$ is the temperature at which the coalescing agent begins to fall or precipitate out of solution. As temperature of the coalescing agent continues to increase, more and more of the coalescing agent (or surfactant), falls out of solution. At these temperatures, the precipitated coalescing agent acts as a defoamer, while the coalescing agent still in solution acts as a coalescent. It is believed that while coalescing may be occurring even below the $T_{CP}$ of the coalescing agent, the coalescing effect and resulting bubble structure is positively impacted by the transition at and above the $T_{CP}$ of the coalescing agent. It is believed that this action imparts the slurry and therefore, the reaction product, with improved bubble structure. This bubble structure helps to reduce the bulk density of the gypsum matrix which translates to a reduction of weight per unit volume, while generally maintaining other desirable properties for gypsum board such as sufficient nail pull and compressive strength. The bubble structure may include bubbles (or voids, cavities, pockets, etc.) of various sizes and shapes as described below. The bubbles typically include air, but other gases may be present as well, such as an inert gas, e.g. nitrogen gas.

The $T_{CP}$ can be determined by various methods in the art, such as according to the method described by ASTM D2024. Typically, an amount of the coalescing agent is added to water, e.g. 1 wt %, to form a solution, and the solution is increased in temperature until the solution becomes hazy or cloudy, which generally indicates that the coalescing agent is falling out of the solution. The coalescing agent typically has a $T_{CP}$ of from about 16.0 to about 60.0, about 18.0 to about 60.0, or about 20.0 to about 60.0, ° C., according to ASTM D2024. It is to be appreciated that the $T_{CP}$ of the coalescing agent alone, relative to the $T_{CP}$ of the coalescing agent while in the slurry, i.e., in combination with the foaming agent, may shift higher or lower than the temperatures described above. However, it is still believed that the effects described herein, based on the $T_{CP}$ transition, remain.

As described above, the reaction between the calcined gypsum and water is exothermic. As such, the slurry typically has a significant rise in temperature from the $T_1$ to the $T_2$ after mixing, i.e., once the reaction product starts forming. The change in temperature may be upwards of 15 to 20° C. or more from the $T_1$ to the $T_2$. By selecting a suitable coalescing agent having a $T_{CP}$ within this range ($T_1$, $T_2$), bubble formation and coalescing can be controlled in the slurry, and therefore, the reaction product. It is also possible that the temperature of the slurry is controlled in such a way that the coalescing agent can be activated or deactivated based on the $T_{CP}$ being passed or not.

As alluded to above, the $T_1$ can vary. This may occur based on the stucco temperature and/or water temperature, and such conditions can change on a daily basis, especially on a seasonal basis. The largest factor on the $T_1$ is typically the temperature of the stucco being used to create the slurry. To create stucco, natural gypsum is mined, dried, crushed and calcined to yield stucco. As a result, the temperature of the stucco being supplied to create the slurry can vary depending on the period of time that has passed since it was calcined and the storage conditions of where the stucco is being stored prior to being added to the mixer. Based on these factors, a coalescing agent can be selected which has a suitable $T_{CP}$ for the respective site, the $T_1$ of the slurry, and/or the range of the $T_1$ and $T_2$.

The $T_1$ of the slurry and the temperature range of the slurry at a particular manufacturing site can be estimated by various means, such as by guess and check, calculating the temperature range of the reaction by referring to historical temperature data of at least one previous slurry formed at the site, calculating the temperature range of the reaction according to Hess's law, etc. Once the $T_1$ of the slurry and the temperature range ($T_1$, $T_2$) at a particular manufacturing site is determined, the appropriate coalescing agent having a desired $T_{CP}$ can be utilized.

In certain embodiments, the coalescing agent comprises an ethylene oxide-propylene oxide (EO/PO) block copolymer and/or a reverse EO/PO block copolymer, i.e., a PO/EO block copolymer. Specific examples of suitable block copolymers include: straight block polymeric glycols obtained, for example, by the addition of ethylene oxide (EO) on a condensation product of propylene oxide (PO) with propylene glycol; and reverse block copolymers obtained, for example, by adding ethylene oxide to ethylene glycol to provide a hydrophile of designated molecular weight, and adding polypropylene oxide to obtain hydrophobic blocks on the outside of the molecule.

Reversing the hydrophobic and hydrophilic blocks of the copolymer PO/EO/PO creates surfactants similar to the regular EO/PO/EO block copolymers, but with some notable differences. Without being limited by any particular theory, it is believed that while the EO/PO/EO straight block copolymers tend to be better emulsifiers and dispersants and cover a broader range of molecular weights, the reverse block copolymers (i.e., PO/EO/PO block copolymers) have lower foaming, greater defoaming, and reduced gelling tendencies. Additionally, reverse block copolymers are typically terminated by secondary hydroxyl groups, which have lower reactivity and acidity than the primary hydroxyl groups which generally terminate EO/PO/EO straight block copolymers. These block copolymers may also be referred to in the art as polaxamers or triblock copolymers. In certain embodiments, the coalescing agent comprises a block copolymer surfactant, which is commercially available from BASF Corporation of Florham Park, N.J.

In other embodiments, the coalescing agent comprises an alkoxylated alcohol, such as a fatty alcohol alkoxylate. Exemplary nonionic surfactants are high and low foam surfactants such as alkoxylated higher alcohols in which the alcohol contains 6 to 18 carbon atoms and the number of moles of lower alkylene oxide (2 or 3 carbon atoms) is from 3 to 12. Exemplary nonionic surfactants include the low foam surfactants from BASF Corporation. These surfactants are typically the reaction product of linear and/or branched alcohol(s) and a mixture of propylene oxide and ethylene oxides, containing a mixed chain of propylene oxide and ethylene oxide terminated by a hydroxyl group. A specific example includes a $C_6$-$C_{10}$ fatty alcohol condensed with 6 to 12 moles of ethylene oxide and 3 moles of propylene oxide.

In certain embodiments, the coalescing agent is an EO/PO block copolymer. In other embodiments, the coalescing agent is an EO/PO reverse block copolymer. In other embodiments, the coalescing agent is an alcohol alkoxylate. In yet other embodiments, the coalescing agent is a combination of straight (EO/PO/EO) and/or reverse (PO/EO/PO) block copolymers and/or alcohol alkoxylates. The coalescing agent may also be referred to in the art as a nonionic surfactant.

The coalescing agent typically has a hydrophilic-lipophilic balance (HLB) of from about 1 to about 31, or about 1 to about 15. If employed, the EO/PO block copolymer typically has a hydrophilic-lipophilic balance (HLB) of from about 7 to about 15. If employed, the EO/PO reverse block copolymer has a hydrophilic-lipophilic balance (HLB) of from about 1 to about 7.

The coalescing agent typically has an average molecular weight of from about 1000 to about 4000. If employed, the EO/PO block copolymer typically has an average molecular weight of from about 2000 to about 3500. If employed, the EO/PO reverse block copolymer typically has an average molecular weight of from about 2000 to about 3500.

The coalescing agent typically has an ethylene oxide (EO) or hydrophilic block content of from about 10 to about 50 wt % based on 100 parts of the coalescing agent molecule. If employed, the EO/PO block copolymer typically has an EO content of from about 20 to about 45 wt %. If employed, the EO/PO reverse block copolymer typically has an EO content of from about 20 to about 45 wt %.

The coalescing agent can be used in various amounts. Typically, the coalescing agent is present in the slurry in an amount of from about 0.01 to about 1.0 lbs per 1000 square feet (msf), about 0.05 to about 0.5 lbs/msf, or about 0.10 to about 0.25 lbs/msf. The foaming agent and the coalescing agent are typically present in the slurry in a weight ratio of from about 20:1 to about 3:1, about 7.5:1 to about 5:1, or about 7:1 to about 6:1.

The slurry can also include an additive component. The additive component can include any type of additive or additives. Examples of suitable additives include those described in the incorporated references, as well as starches, accelerators, fibers (such as paper and/or glass fibers), potash, clay, boric acid, plasticizers, fire retarders, mildew retarders, thickeners, dispersants, or a combination thereof. The additive component can be used in various amounts and can include one or more of the aforementioned additives. Specific amounts of certain additives can be appreciated with reference to the Examples section below. The additives can be used in amounts greater or less than those amounts specifically illustrated therein.

The slurry can be formed by conventional methods. Examples of such methods, and apparatuses for forming the slurry, are described in the incorporated references. Typically, the slurry is formed using a mixer and a conveyor. The components of the slurry are provided and added to the mixer. The mixer typically has one or more feeds, such as a feed for dry components, e.g. the calcined gypsum, and one or more feeds for wet components, e.g. the water and the foam. The components are mixed in the mixer to form the (foamed) slurry. Each of the components can be added to the mixer at various times and in various combinations.

The coalescing agent can be added as part of the water being added to the slurry, such as part of the gauging water, pulp water, or foam water used to create the slurry. The coalescing agent can also be added to the slurry through a conduit in the slurry discharge so that when the slurry passes through the slurry discharge the coalescing agent is added to the slurry as the slurry is deposited on the cover sheet. The coalescing agent can also be added directly to the mixer and/or to the foam generator. The coalescing agent may be delivered to the slurry neat or as part of a dilution. If employed, the other additive components can be added in a similar fashion.

As described above, once the calcined gypsum and water come into contact, they generally begin reacting to form the reaction product. The foaming agent forms a plurality of bubbles in the slurry, i.e., the foam formed from the foaming agent forms the plurality of bubbles in the slurry. Typically after a period of time has passed, e.g. once the temperature of the slurry approaches the $T_{CP}$ of the coalescing agent, the coalescing agent begins coalescing the plurality of bubbles in the slurry. The slurry is typically fed to a conveyor having a cover sheet disposed thereon. A forming plate skims the foamed slurry such that the reaction product is of a certain thickness.

The delayed coalescing action of the coalescing agent allows the slurry to pass through the forming plate without losing its volume. If the foamed slurry defoams too quickly, it generally loses its initial volume and more foam is needed to maintain the necessary volume required to maintain thickness of the slurry which eventually translates to thickness of the reaction product/gypsum layer formed therefrom. In addition, even as some bubbles continue to collapse or coalesce, the combination of the foam and coalescing agent, and resulting matrix of gypsum and bubbles, substantially maintains thickness of the gypsum layer as it sets. In certain embodiments, the coalescing agent begins substantially coalescing the bubbles imparted by the foam proximal the forming plate, such as before the forming plate, at the forming plate, and/or after the forming plate. The slurry is typically conveyed through the forming plate.

The combination of the bubbles imparted by the foam and the coalescing agent establishes a plurality of bubbles in the gypsum layer. The bubbles typically have an average diameter of from about 150 to about 800, about 200 to about 700, or about 300 to about 600, microns.

Typically, a second cover sheet is applied to the gypsum layer to form the gypsum board; however, the gypsum board may also include just one cover sheet and the gypsum layer. The cover sheet(s) can be folded to encapsulate edges of the gypsum layer. The gypsum layer is typically sandwiched between the cover sheets. The cover sheets can be formed from various materials, such as from paper or fiberglass. The cover sheets may be the same as or different than each other, and may be referred to as Face and Back sheets. Examples of suitable cover sheets are described in the incorporated references. Certain types of cover sheets may have additives or make-ups which impart desirable fire or mildew retarding properties.

Heat can be applied to the gypsum board to remove residual water from the gypsum layer. Various methods of removing residual water can be utilized, such as by employing dryers or drying chambers. Certain dispersants/plasticizers may be used to reduce the amount of water, hence reducing the eventual drying time/energy needed to produce the gypsum board.

The gypsum board can eventually be cut into various lengths. Typically dimensions of the gypsum boards include a width of about 48 inches (~120 cm) to about 52 inches (~137 cm), and a thickness of from ¼ inch (~6 mm) to about 1 inch (~25 mm), about ½ inch (~13 mm) to about ⅝ inch (~16 mm), or about ¼ inch to about and ⅜ inch (~10 mm). The gypsum board may be made with different edges, for example, with two different edge treatments: a tapered edge, where the long edges of the board are tapered with a wide bevel at the front to allow for jointing materials to be finished flush with the main board face; and a plain edge, used where the whole surface will receive a thin coating (skim coat) of finishing plaster. The present invention is not limited to any particular dimension or configuration of the gypsum board.

The gypsum board can have various physical properties. Typically, the gypsum board has reduced weight relative to conventional gypsum boards of the same general dimensions, due to the bubbles defined therein. It is believed that the gypsum boards also have strengths approaching or even surpassing the strengths of conventional gypsum boards of the same general dimensions.

The weight of the gypsum board produced from this slurry will be dependent on how thick the board is. For example, a ½ inch thick gypsum board typically has a weight of less than about 1500 lbs per 1000 square feet (msf), about 1200 to 1400 lbs/msf, or about 1200 to 1350 lbs/msf. The gypsum board shall also have sufficient strength and paper-to-core bond strength to meet the requirements set forth in ASTM C1396 for wallboard. Such characteristics are measured by a variety of different measurements, including, but not limited to, nail pull strength, humidified deflection, compressive strength, and humidified paper core bond integrity.

While gypsum slurries and boards are generally described herein, the coalescing agent(s) of the present invention may also be used in other industries including, but not limited to, the cement industry, the mortar (masonry) industry, and the pavement industry. Specifically, the coalescing agent(s) of the present invention may be used in any composition where strategic entrapment of air bubbles is desired. Such compositions can include concrete compositions, including concrete compositions generally comprising cement (e.g. Portland cement), water, aggregate, and optionally, other conventional additives understood in the art. Examples of cement compositions, and components thereof, are described in U.S. Pat. No. 6,489,381; U.S. Pat. No. 4,772,328; U.S. Pat. No. 4,018,618; U.S. Pat. No. 6,545,067; U.S. Pat. No. 6,803,396; US Pub. No. 2002/0132946; U.S. Pat. No. 4,018,618; U.S. Pat. No. 7,008,990; U.S. Pat. No. 7,399,355; U.S. Pat. No. 7,655,710; U.S. Pat. No. 7,855,260; U.S. Pat. No. 7,612,150; U.S. Pat. No. 7,202,319; US Pub. No. 2010/0210761; US Pub. No. 2007/0227404; U.S. Pat. No. 6,617,387; U.S. Pat. No. 6,803,396; U.S. Pat. No. 5,258,072; U.S. Pat. No. 6,809,148; U.S. Pat. No. 6,656,994; U.S. Pat. No. 5,258,072; and U.S. Pat. No. 5,783,549; the disclosures of which are incorporated herein by reference in their entirety so long as the incorporated disclosure does not conflict with the general scope of the present invention.

It is to be appreciated that many changes can be made to the following examples, while still obtaining like or similar results. Accordingly, the following examples, illustrating embodiments of the slurries and gypsum boards of the present invention, are intended to illustrate and not to limit the invention.

EXAMPLES

Examples of slurries and gypsum boards are formed using conventional methods. Referring to the Figures, cross-sections of various gypsum cores and gypsum boards can be appreciated. As illustrated in the Figures, the gypsum cores and boards of the present invention using the slurries disclosed herein include larger bubbles relative to the control/comparative gypsum cores and gypsum boards.

Figure 1:
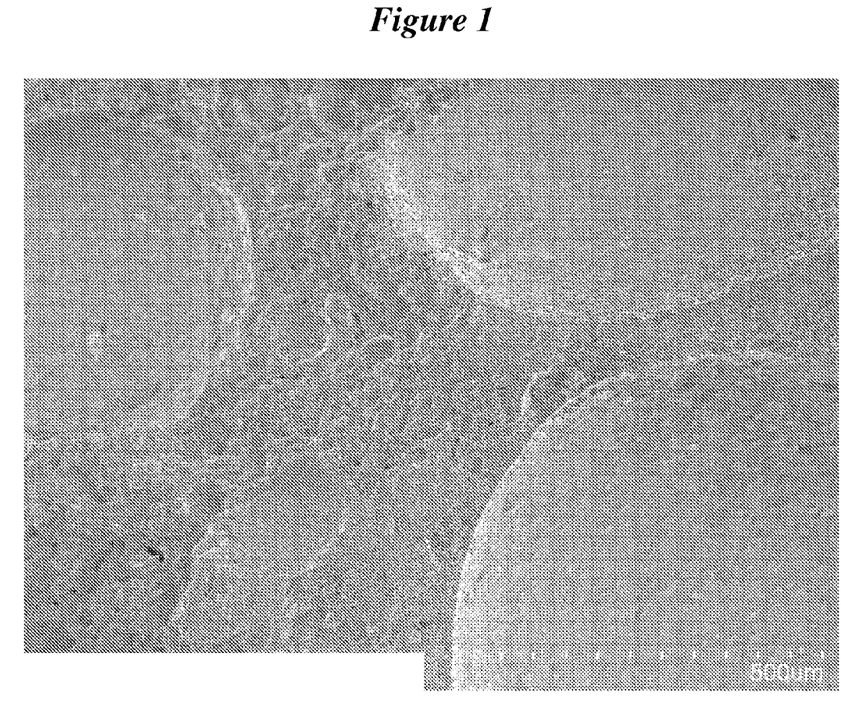
FIG. 1 is a scanning electron microscope (SEM) photograph of a cross-section of a gypsum layer of an invention gypsum board illustrating a plurality of bubbles.
Figure 2:
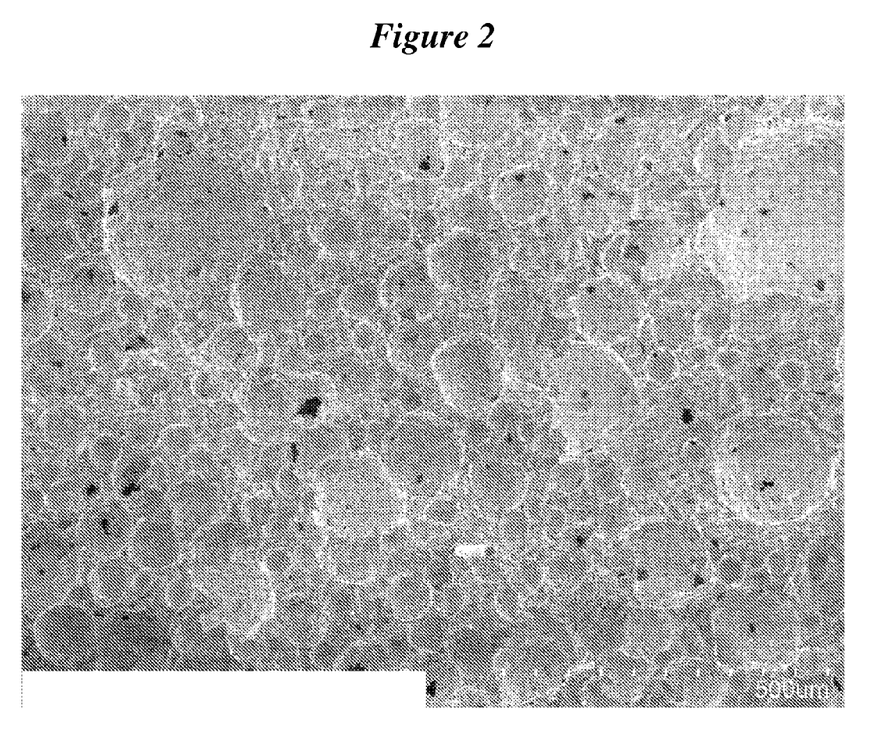
FIG. 2 is a SEM photograph of a cross-section of Control 1 illustrating a gypsum layer having a plurality of smaller bubbles.
Figure 3:
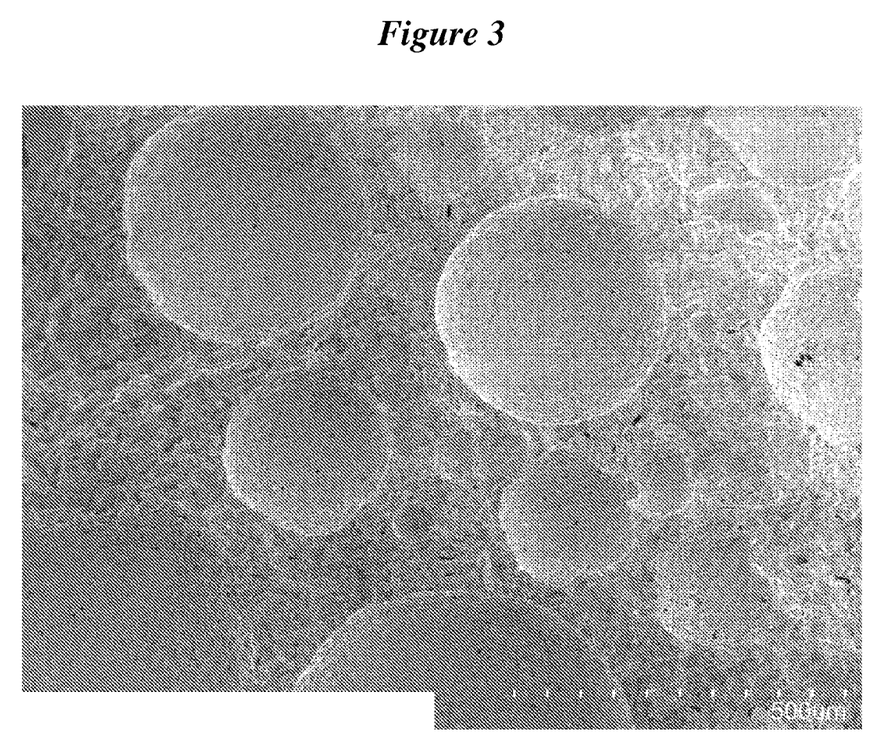
FIG. 3 is a SEM photograph of a cross-section of Example 1 illustrating a gypsum layer having a plurality of larger bubbles.
Figure 4:
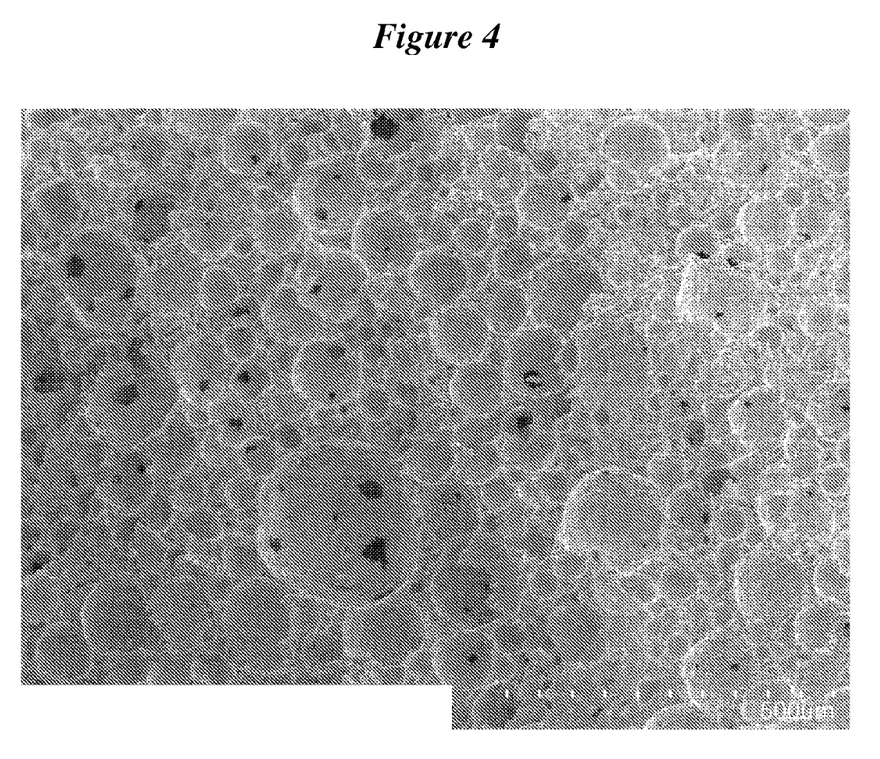
FIG. 4 is a SEM photograph of a cross-section of Control 3 illustrating a gypsum layer having a plurality of smaller bubbles.
Figure 5:
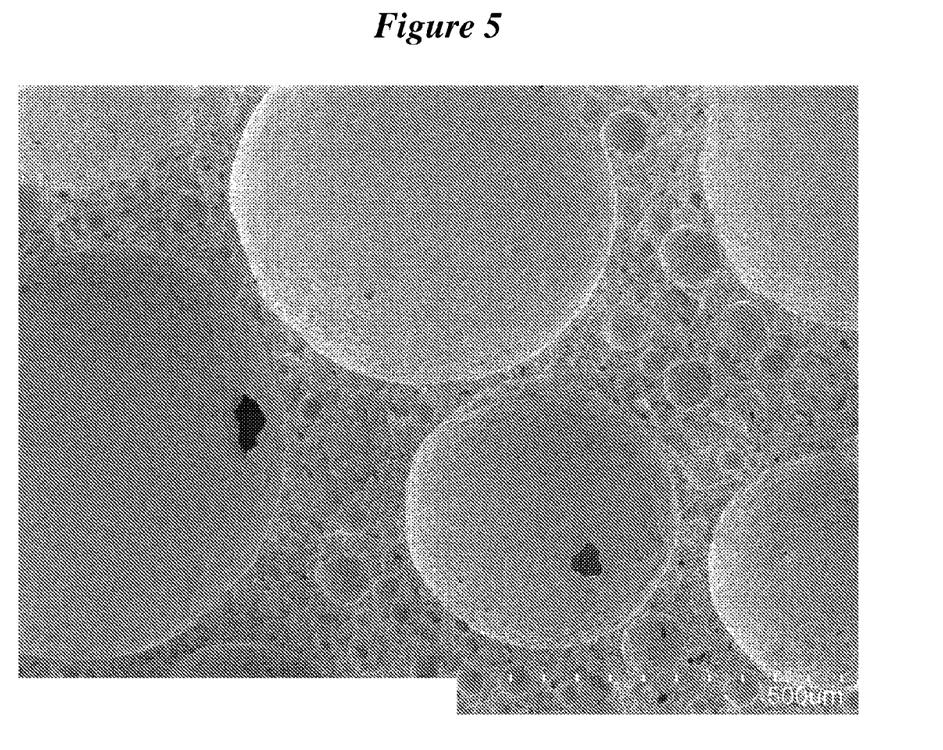
FIG. 5 is a SEM photograph of a cross-section of Example 2 illustrating a gypsum layer having a plurality of larger bubbles.
Figure 6:
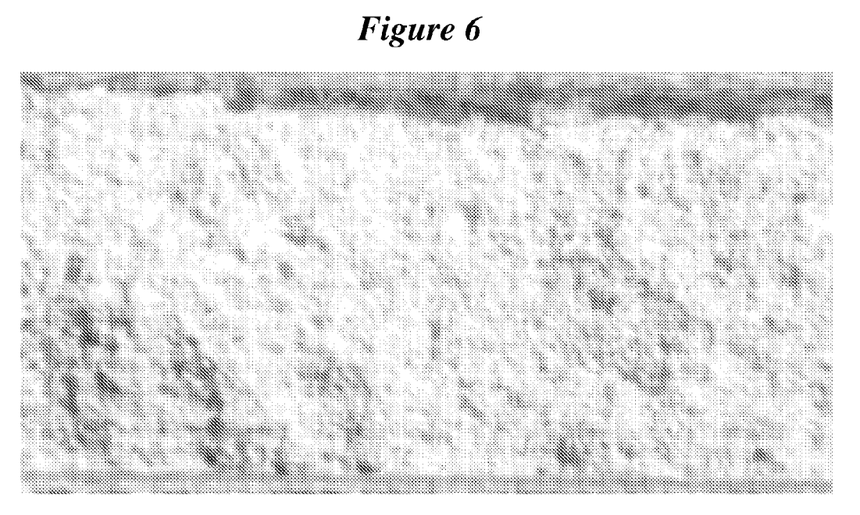
FIG. 6 is a cross-sectional picture of a control gypsum board manufactured in a first manufacturing site.
Figure 7:
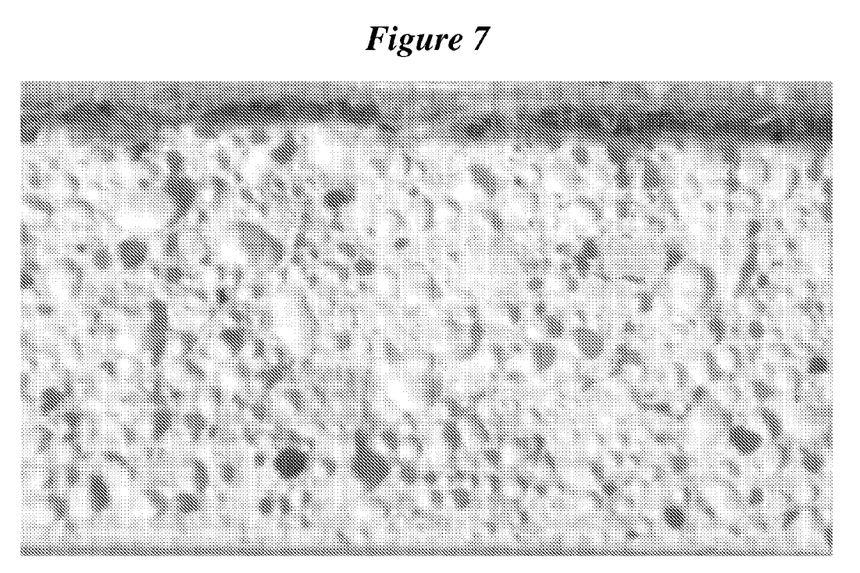
FIG. 7 is a cross-sectional picture of an invention gypsum board manufactured in the first manufacturing site, employing Coalescing Agent 2, and having a plurality of larger bubbles.
Figure 8:
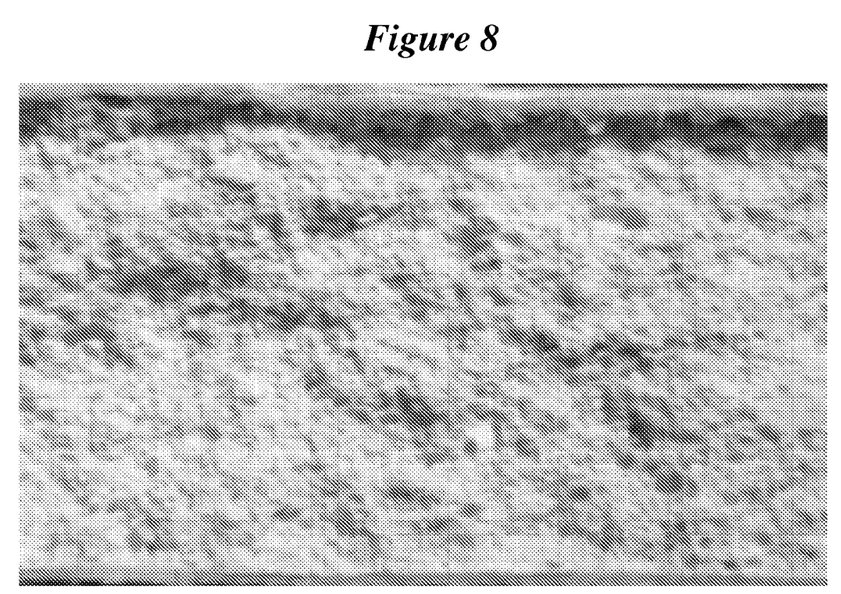
FIG. 8 is a cross-sectional picture of a control gypsum board manufactured in a second manufacturing site.
Figure 9:
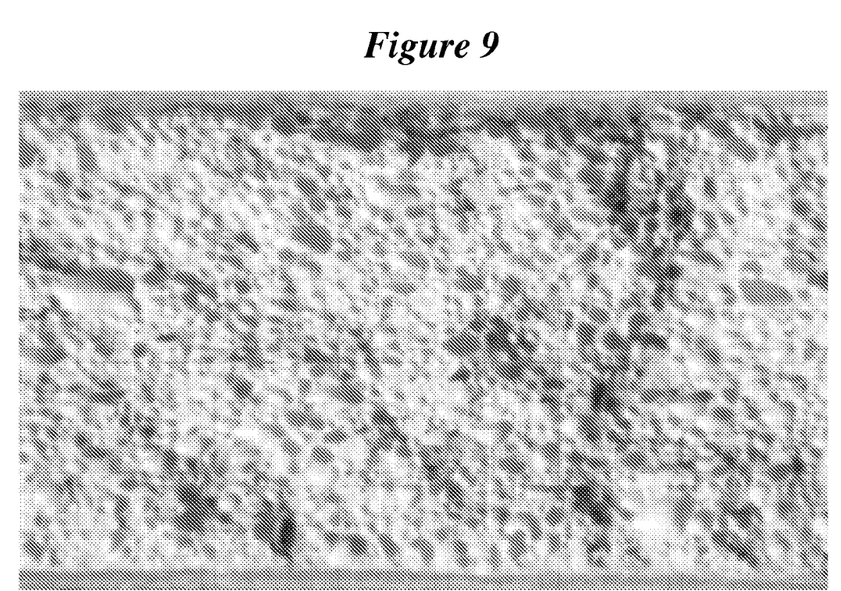
FIG. 9 is a cross-sectional picture of an invention gypsum board manufactured in the second manufacturing site, employing Coalescing Agent 2, and having a plurality of larger bubbles.
Figure 10:
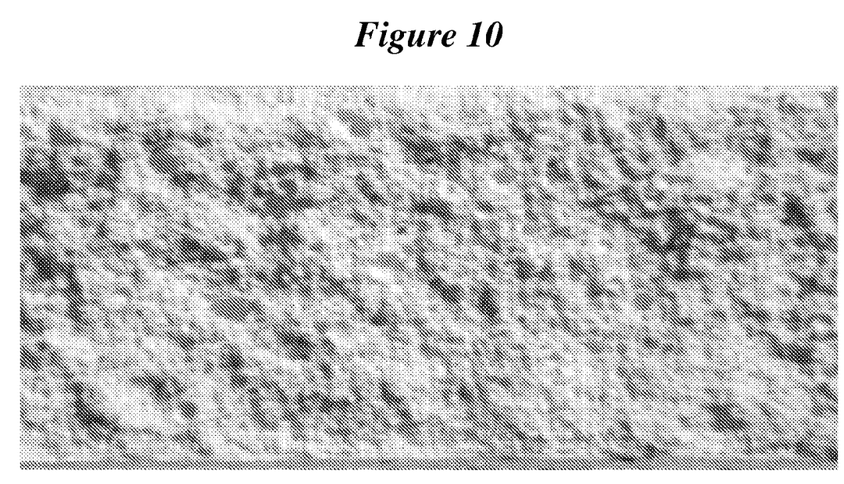
FIG. 10 is a cross-sectional picture of a control gypsum board manufactured in a third manufacturing site.
Figure 11:
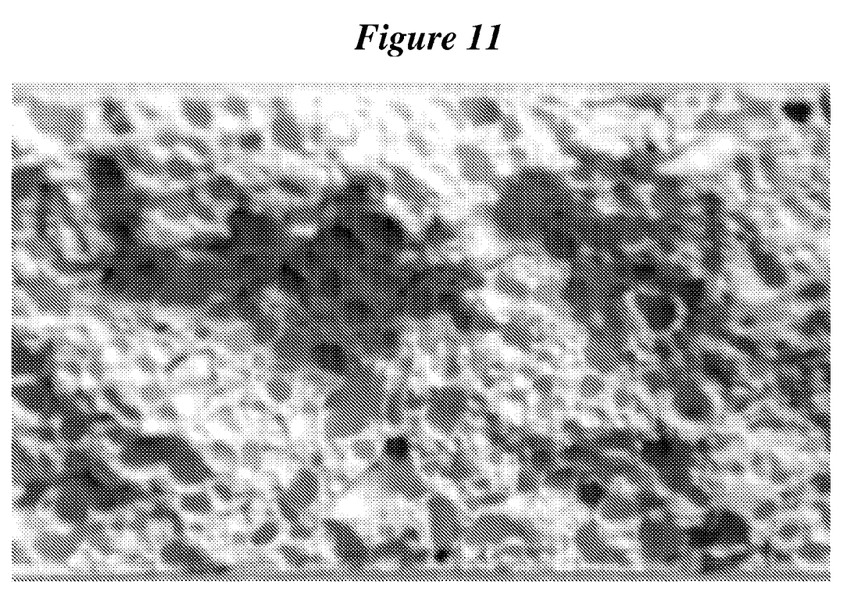
FIG. 11 is a cross-sectional picture of an invention gypsum board manufactured in the third manufacturing site, employing Coalescing Agent 2, and having a plurality of larger bubbles.
Figure 12:
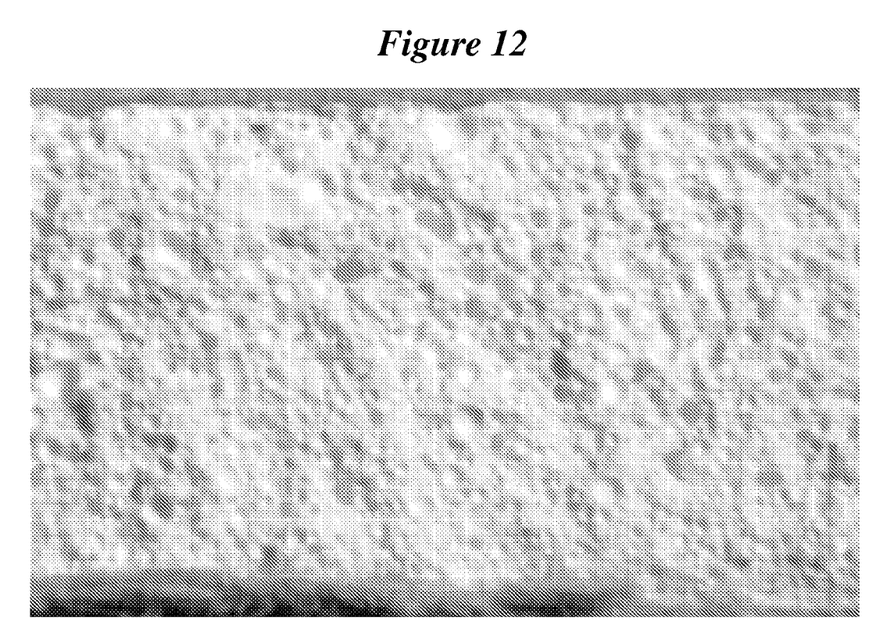
FIG. 12 is a cross-sectional picture of an invention gypsum board manufactured in a fourth manufacturing site, employing Coalescing Agent 2, and having a plurality of larger bubbles.

FIG. 1 generally shows the effect of a coalescing agent on the air bubbles in the gypsum core from a trial at a gypsum board manufacturing plant. As illustrated, the gypsum core includes large bubbles and thick gypsum walls between the bubbles.

Table I below illustrates nail pull results after addition of a coalescing agent disclosed herein. As illustrated in the Table, the board weight is essentially the same between the ½ inch gypsum boards while nail pull strength increases by about 17%. This increase in strength is believed to be imparted by the bubble structure as shown in FIG. 1.

TABLE I

|  | Control 1 | Example 1 |
|---|---|---|
| Board Weight (lb/msf) | 1595 | 1598 |
| Foaming Agent 1 (lb/msf) | 0.66 | 0.77 |
| Coalescing Agent 1 (lb/msf) | 0.0 | 0.07 |
| Nail-Pull (lbf) | 82 | 96 |

Foaming Agent 1 is an ammonium ether sulfate, commercially available from Stepan Company.

Coalescing Agent 1 is an EO/PO reverse block copolymer having a cloud point ($T_{CP}$) of from about 16.0 to about 60.0° C. according to ASTM D2024 and an ethylene oxide (EO) weight percent of from about 10 to about 50 based on 100 parts by weight of the reverse EO/PO block copolymer, commercially available from BASF Corporation.

Table II below illustrates additional examples with and without the coalescing agent of the present invention. A variety of additives are also employed.

TABLE II

| Component (lb/msf) | Control 2 | Control 3 | Example 2 |
|---|---|---|---|
| Calcined Gypsum (dry) | 1168 | 1048 | 1042 |
| Foaming Agent 1 | 0.7 | 1.02 | 1.0 |
| Coalescing Agent 2 | 0.0 | 0.0 | 0.15 |
| Potash | 3.2 | 1.5 | 0.75 |
| Accelerator | 9.0 | 9.5 | 8.4 |
| Fiberglass | 1.0 | 1.0 | 1.0 |
| Regular Starch | 8.0 | 9.0 | 9.0 |
| Starch—Pregelled | 0.0 | 0.0 | 5.0 |
| Retarder | 0.1 | 0.1 | 0.1 |
| Cellulose Ether | 0.0 | 0.0 | 0.5 |
| Boric Acid | 0.0 | 0.0 | 0.5 |
| Dry Water/Calcined Gypsum ratio | 0.86 | 0.88 | 0.93 |
| Board Weight (lb/msf) | 1490 | 1344 | 1340 |
| Nail Pull (lbf/msf) | 84 | 65 | 81 |
| 20 Hr humidified Bond (Face/Back) | 1%/3% | 10%/95% | 0%/1% |
| Humidified Deflection (inches) | — | 0.07 | 0.08 |

Coalescing Agent 2 is an EO/PO reverse block copolymer, having a cloud point ($T_{CP}$) of from about 16.0 to about 60.0° C. according to ASTM D2024 and an ethylene oxide (EO) weight percent of from about 10 to about 50 based on 100 parts by weight of the reverse EO/PO block copolymer, commercially available from BASF Corporation.

Accelerator is a ball mill accelerator, and is dry fed to the slurry.

Cellulose ether is ethyl hydroxyethyl cellulose, commercially available from AkzoNobel Corporation. The cellulose ether acts as a thickener and helps control the slurry fluidity. It is dry fed to the slurry.

The regular starch is acid modified corn starch and is dry fed to the slurry.

The water comprises pulp water, gauging water, and foam water. The pulp water can be about 180 lbs/msf, the foam water can range from about 100 lbs/msf to about 525 lbs/msf, and the gauging water can range from about 220 lbs/msf to about 660 lbs/msf.

Additional benefits can be appreciated with reference to Table II and the Figures. For example, difference in bubble size between Control 3 (~50 to 300 microns) and Example 2 (~400 to 800 microns) can be better appreciated. Example 2 is considered to have excellent bubble structure and physical properties. As described above, it is believed that these physical properties are imparted by the coalescing agent of the present invention, especially when the coalescing action is delayed such that it begins after a period of time has passed, such as once the slurry is on the conveyor and/or at the forming plate. The coalescing action may start at any time after the slurry is formed and before the reaction product sets. Two or more different coalescing agents may be employed such that two or more coalescing actions and respective periods of time can be employed.

FIGS. 7 through 12 show additional controls and invention examples of gypsum boards. The gypsum boards are manufactured at different manufacturing sites throughout the U.S. The gypsum board of FIG. 7 includes about 10 wt % of Coalescing Agent 2 based on 100 parts of the respective foaming agent, and each of the gypsum boards of FIGS. 9, 11, and 12 includes about 25 wt % of Coalescing Agent 2 based on 100 parts of the respective foaming agent. As illustrated in these Figures, the invention gypsum boards have excellent bubble structure relative to the control boards.

Regarding the bubble structure, as illustrated in the Figures, the solid fraction in between the bubbles (comprising gypsum) is wider when the bubbles are larger and discrete. It is believed that this bubble structure slows crack propagation in the gypsum core when running a nail pull test. It is also believed that larger and discrete bubbles in the gypsum core have more gypsum crystals or less bubbles at the sheet/gypsum core interface resulting in a better paper-to-core bond. It is also believed that the narrower the size distribution of the bubbles in the gypsum core, the higher the space between the bubbles, which results in higher nail pull strength.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims.

In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims.

Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both singly and multiply dependent, is herein expressly contemplated.

What is claimed is:

1. A gypsum board comprising a cover sheet and a gypsum layer disposed on said cover sheet, said gypsum layer defining a plurality of bubbles dispersed therein and comprising the reaction product of:

calcined gypsum; and water;

wherein an exothermic reaction occurs between said calcined gypsum and water, with said reaction product having a temperature ranging from an initial temperature ($T_1$) to a peak temperature ($T_2$) during formation;

in the presence of a foaming agent comprising a surfactant for creating a foam to impart a plurality of bubbles in said reaction product; and a coalescing agent comprising an ethylene oxide-propylene oxide (EO/PO) block copolymer and/or a reverse EO/PO block copolymer, with said coalescing agent having a cloud point ($T_{CP}$) of from about 16.0 to about 60.0° C. according to ASTM D2024 and that is between the initial temperature ($T_1$) and the peak temperature ($T_2$) of said reaction product, such that said coalescing agent coalesces the plurality of bubbles imparted by the foam thereby establishing the plurality of bubbles in said gypsum layer.

2. A gypsum board as set forth in claim 1 wherein said foaming agent and said coalescing agent are present in a weight ratio of from about 20:1 to about 3:1.

3. A gypsum board as set forth in claim 1 wherein said coalescing agent has a cloud point ($T_{CP}$) of from about 18.0 to about 60.0° C. according to ASTM D2024.

4. A gypsum board as set forth in claim 1 wherein said ethylene oxide-propylene oxide (EO/PO) block copolymer and/or said reverse EO/PO block copolymer has an ethylene oxide (EO) weight percent of from about 10 to about 50 based on 100 parts by weight of said EO/PO block copolymer.

5. A gypsum board as set forth in claim 1 wherein said coalescing agent is said reverse EO/PO block copolymer.

6. A gypsum board as set forth in claim 1 wherein said coalescing agent is present in an amount of from about 0.01 to about 1.0 lbs per 1000 square feet (msf) of said gypsum board.

7. A gypsum board as set forth in claim 1 wherein said surfactant of said foaming agent comprises a sulfate or a sulfonate.

8. A gypsum board as set forth in claim 1 wherein said surfactant of said foaming agent comprises an ammonium ether sulfate.

9. A gypsum board as set forth in claim 1 wherein said surfactant of said foaming agent comprises an ammonium ether sulfate and said coalescing agent is a reverse EO/PO block copolymer, with said reverse EO/PO block copolymer having an ethylene oxide (EO) weight percent of from about 10 to about 50 based on 100 parts by weight of said reverse EO/PO block copolymer.

10. A gypsum board as set forth in claim 9 wherein said foaming agent and said coalescing agent are present in a weight ratio of from about 7.5:1 to about 5:1.

11. A gypsum board as set forth in claim 9 wherein said foaming agent is present in an amount of from about 0.1 to about 2.0 lbs per 1000 square feet (msf) of said gypsum board and said coalescing agent is present in an amount of from about 0.05 to about 1.0 lbs per 1000 square feet (msf) of said gypsum board.

12. A gypsum board as set forth in claim 1 wherein said foaming agent is present in an amount of from about 0.1 to about 2.0 lbs per 1000 square feet (msf) of said gypsum board.

13. A gypsum board as set forth in claim 1 formed in yet the further presence of an additive component comprising at least one of a starch, an accelerator, glass fibers, potash, a thickening agent, boric acid, or a combination thereof.

14. A gypsum board as set forth in claim 1 wherein said water and said calcined gypsum are reacted in a weight ratio of from about 0.5 to about 1.5.

15. A gypsum board as set forth in claim 1 wherein the plurality of bubbles have an average diameter of from about 200 to about 800 microns.

16. A gypsum board as set forth in claim 1 having a weight of less than about 1500 lbs per 1000 square feet (msf).

17. A gypsum board as set forth in claim 1 further comprising a second cover sheet spaced from said cover sheet with said gypsum layer sandwiched between said cover sheets.

18. A gypsum board as set forth in claim 1 wherein said coalescing agent is said ethylene oxide-propylene oxide (EO/PO) block copolymer.

19. A method of forming a gypsum board comprising a cover sheet and a gypsum layer disposed on the cover sheet, the gypsum layer defining a plurality of bubbles dispersed therein and comprising the reaction product of calcined gypsum and water, wherein an exothermic reaction occurs between the calcined gypsum and water, with the reaction product having a temperature ranging from an initial temperature ($T_1$) to a peak temperature ($T_2$) during formation in the presence of a foaming agent comprising a surfactant for creating a foam to impart a plurality of bubbles in the reaction product and a coalescing agent comprising an ethylene oxide-propylene oxide (EO/PO) block copolymer and/or a reverse EO/PO block copolymer, with the coalescing agent having a cloud point ($T_{CP}$) of from about 16.0 to about 60.0° C. according to ASTM D2024 and that is between the initial temperature ($T_1$) and the peak temperature ($T_2$) of the reaction product, such that the coalescing agent coalesces the plurality of bubbles imparted by the foam thereby establishing the plurality of bubbles in the gypsum layer, said method comprising the steps of:
providing the calcined gypsum;
providing the water;
providing the foaming agent;
providing the coalescing agent; and
mixing the calcined gypsum, water, foaming agent, and coalescing agent to form the slurry;
disposing the slurry on the cover sheet; and
allowing the slurry to set to form the reaction product, gypsum layer, and the gypsum board.

20. A method as set forth in claim 19 wherein the foaming agent and the coalescing agent are present in a weight ratio of from about 10:1 to about 5:1.

21. A method as set forth in claim 19 wherein the coalescing agent has a cloud point ($T_{CP}$) of from about 18.0 to about 60.0° C. according to ASTM D2024.

22. A method as set forth in claim 19 wherein the ethylene oxide-propylene oxide (EO/PO) block copolymer and/or the reverse EO/PO block copolymer has an ethylene oxide (EO) weight percent of from about 10 to about 50 based on 100 parts by weight of the EO/PO block copolymer.

23. A method as set forth in claim 19 wherein the coalescing agent is the reverse EO/PO block copolymer.

24. A method as set forth in claim 19 wherein the coalescing agent is present in an amount of from about 0.05 to about 1.0 lbs per 1000 square feet (msf) of the slurry.

25. A method as set forth in claim 19 wherein the surfactant of the foaming agent comprises a sulfate or a sulfonate.

26. A method as set forth in claim 19 wherein the surfactant of the foaming agent comprises an ammonium ether sulfate.

27. A method as set forth in claim 19 wherein the surfactant of the foaming agent comprises an ammonium ether sulfate and the coalescing agent is a reverse EO/PO block copolymer, with the reverse EO/PO block copolymer having an ethylene oxide (EO) weight percent of from about 10 to about 50 based on 100 parts by weight of the reverse EO/PO block copolymer.

28. A method as set forth in claim 19 wherein the foaming agent and the coalescing agent are present in the slurry a weight ratio of from about 7.5:1 to about 5:1.

29. A method as set forth in claim 19 wherein the foaming agent is present in an amount of from about 0.5 to about 2.0 lbs per 1000 square feet (msf) of the slurry and the coalescing agent is present in an amount of from about 0.05 to about 1.0 lbs per 1000 square feet (msf) of the slurry.

30. A method as set forth in claim 19 wherein the foaming agent is present in an amount of from about 0.5 to about 2.0 lbs per 1000 square feet (msf) of the slurry.

31. A method as set forth in claim 19 further comprising the step of premixing a portion of the water and the foaming agent separate from the calcined gypsum prior to the step of mixing.

32. A method as set forth in claim 19 further comprising the step of premixing a portion of the water and the coalescing agent separate from the calcined gypsum prior to the step of mixing.

33. A method as set forth in claim 19 further comprising the step of providing an additive component such that the step of mixing is further defined as mixing the calcined gypsum, water, foaming agent, coalescing agent, and the additive component to form a slurry.

34. A method as set forth in claim 33 wherein the additive component comprises a starch, an accelerator, glass fibers, potash, a thickening agent, boric acid, or a combination thereof.

35. A method as set forth in claim 19 further comprising the steps of providing a second cover sheet and applying the second cover sheet to the gypsum layer opposite the cover sheet such that the gypsum layer is sandwiched between the cover sheets.

36. A method as set forth in claim 19 further comprising the step of applying heat to the gypsum board to remove residual water from the gypsum layer.

* * * * *

UNITED STATES PATENT AND TRADEMARK OFFICE
CERTIFICATE OF CORRECTION

PATENT NO. : 9,181,132 B2
APPLICATION NO. : 13/403490
DATED : November 10, 2015
INVENTOR(S) : Ronald A. Lee et al.

It is certified that error appears in the above-identified patent and that said Letters Patent is hereby corrected as shown below:

ON THE TITLE PAGE ITEM 75

Inventors, after "Iyer", please delete "Matthews" and replace with -- Charlotte --

Signed and Sealed this
Twenty-sixth Day of April, 2016

Michelle K. Lee
*Director of the United States Patent and Trademark Office*